(12) United States Patent
Huang

(10) Patent No.: US 11,960,396 B2
(45) Date of Patent: Apr. 16, 2024

(54) METHOD AND COMPUTER PROGRAM PRODUCT FOR PERFORMING DATA WRITES INTO A FLASH MEMORY

(71) Applicant: Silicon Motion, Inc., Zhubei (TW)

(72) Inventor: Kuo-Ting Huang, Taipei (TW)

(73) Assignee: SILICON MOTION, INC., Zhubei (TW)

( * ) Notice: Subject to any disclaimer, the term of this patent is extended or adjusted under 35 U.S.C. 154(b) by 176 days.

(21) Appl. No.: 17/667,801

(22) Filed: Feb. 9, 2022

(65) Prior Publication Data

US 2022/0269600 A1 Aug. 25, 2022

Related U.S. Application Data

(63) Continuation of application No. 16/445,702, filed on Jun. 19, 2019, now Pat. No. 11,288,185.

(30) Foreign Application Priority Data

Mar. 22, 2019 (CN) .......................... 201910220318.3

(51) Int. Cl.
*G06F 12/02* (2006.01)
*G06F 12/10* (2016.01)

(52) U.S. Cl.
CPC .......... *G06F 12/0253* (2013.01); *G06F 12/10* (2013.01); *G06F 2212/1044* (2013.01);
(Continued)

(58) Field of Classification Search
CPC ................. G06F 12/0253; G06F 12/10; G06F 2212/1044; G06F 2212/7201; G06F 2212/7205

See application file for complete search history.

(56) References Cited

U.S. PATENT DOCUMENTS 7,441,071 B2 10/2008 Traister et al.
9,933,975 B1 4/2018 Ngu
(Continued)

FOREIGN PATENT DOCUMENTS

| CN | 106326136 A | 1/2017 |
|---|---|---|
| TW | 200745930 A | 12/2007 |

(Continued)

OTHER PUBLICATIONS

English translation of the Taiwanese Search Report dated Jun. 9, 2020 for Application No. 108109906.
(Continued)

*Primary Examiner* — Charles Rones
*Assistant Examiner* — Han V Doan
(74) *Attorney, Agent, or Firm* — Birch, Stewart, Kolasch & Birch, LLP

(57) ABSTRACT

The invention introduces a method for performing data writes into a flash memory, at least including the steps: determining whether at least one host write command that requires to process immediately is presented in a submission queue (SQ) before performing a portion of a Host-Flash mapping (H2F) table update or a GC process; and executing the host write command that requires to process immediately in a batch and then performing the portion of the H2F table update or the GC process when the determination is positive.

20 Claims, 10 Drawing Sheets

Related U.S. Application Data

(60) Provisional application No. 62/787,810, filed on Jan. 3, 2019.

(52) U.S. Cl.
CPC ............ *G06F 2212/7201* (2013.01); *G06F 2212/7205* (2013.01)

(56) References Cited

U.S. PATENT DOCUMENTS

| | | |
|---|---|---|
| 2010/0332731 A1 | 12/2010 | Ou |
| 2013/0198416 A1 | 8/2013 | Zhu et al. |
| 2015/0186264 A1 | 7/2015 | Lin et al. |
| 2015/0301763 A1 | 10/2015 | Shaharabany et al. |
| 2016/0011966 A1 | 1/2016 | Keeler et al. |
| 2016/0062908 A1* | 3/2016 | Shen .................... G11C 7/1072 711/105 |
| 2017/0004077 A1 | 1/2017 | Liu et al. |
| 2017/0270042 A1 | 9/2017 | Tseng et al. |
| 2018/0232178 A1* | 8/2018 | Iwaki .................... G06F 3/0659 |
| 2018/0349272 A1 | 12/2018 | Xue et al. |
| 2019/0265909 A1* | 8/2019 | Frolikov ............. G06F 13/1642 |
| 2020/0045134 A1* | 2/2020 | Rozas .................... G06F 3/067 |
| 2020/0150873 A1 | 5/2020 | Saxena et al. |

FOREIGN PATENT DOCUMENTS

| | | |
|---|---|---|
| TW | 201527971 A | 7/2015 |
| TW | I595412 B | 8/2017 |
| TW | 201734804 A | 10/2017 |

OTHER PUBLICATIONS

English translation of the Taiwanese Search Report, dated Apr. 22, 2020, for Taiwanese Application No. 108109906.

Specifcation and Drawings for U.S. Appl. No. 60/705,388, dated Aug. 3, 2005.

* cited by examiner

METHOD AND COMPUTER PROGRAM PRODUCT FOR PERFORMING DATA WRITES INTO A FLASH MEMORY

CROSS-REFERENCE TO RELATED APPLICATIONS

This is a Continuing Patent Application of and claims the benefit of priority to U.S. patent application Ser. No. 16/445,702, filed on Jun. 19, 2019, which claims the benefit of priority to U.S. Provisional Application Ser. No. 62/787,810, filed on Jan. 3, 2019; and Patent Application No. 201910220318.3, filed in China on Mar. 22, 2019; the entirety of which is incorporated herein by reference for all purposes.

BACKGROUND

The disclosure generally relates to storage devices and, more particularly, to method and apparatus for performing data writes into a flash memory.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

The latency of data writes is an important test item of Quality of Service (QoS). The test performs random writes of 4K data into a storage unit for hours to make the storage unit enter a dirty mode. After that, the test proceeds to issue QD1/QD128 commands (CMDs) for randomly writing 4K data into the storage unit for 180 seconds and measure the latency accordingly. Since the storage unit situates in the dirty mode, a NAND flash requires to allocate time for writing the updated Host-Flash (H2F) table of a Dynamic Random Access Memory (DRAM) or a Static Random Access Memory (SRAM) into the storage unit, so as to reduce time for performing a potential Sudden Power Off Recovery (SPOR) in case that SPO happens. Moreover, the NAND flash requires to allocate time for performing garbage collection (GC) processes to avoid the storage unit from being unable to write user data due to insufficient space. Thus, it is desirable to have a method, a computer program product and an apparatus for performing data writes into a flash memory under the dirty mode, so as to meet the requirements of the latency test item.

SUMMARY

In an aspect of the invention, a method for performing data writes into a flash memory is introduced to include the steps: determining whether at least one host write command that requires to process immediately is presented in a submission queue (SQ) before performing a portion of a Host-Flash mapping (H2F) table update or a GC process; and executing the host write command that requires to process immediately in a batch and then performing the portion of the H2F table update or the GC process when the determination is positive.

In another aspect of the invention, a non-transitory computer program product for performing data writes into a flash memory when executed by a processing unit, is introduced to include program code to: determine whether at least one host write command that requires to process immediately is presented in a SQ before performing a portion of a H2F table update or a GC process; and execute the host write command that requires to process immediately in a batch and then perform the portion of the H2F table update or the GC process when the determination is positive.

In still another aspect of the invention, an apparatus for performing data writes into a flash memory is introduced to include a flash interface and a processing unit. The processing unit, coupled to the flash interface, is arranged to operably determine whether at least one host write command that requires to process immediately is presented in a SQ before performing a portion of a H2F table update or a GC process; and execute the host write command that requires to process immediately in a batch and then perform the portion of the H2F table update or the GC process through the flash interface when the determination is positive.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
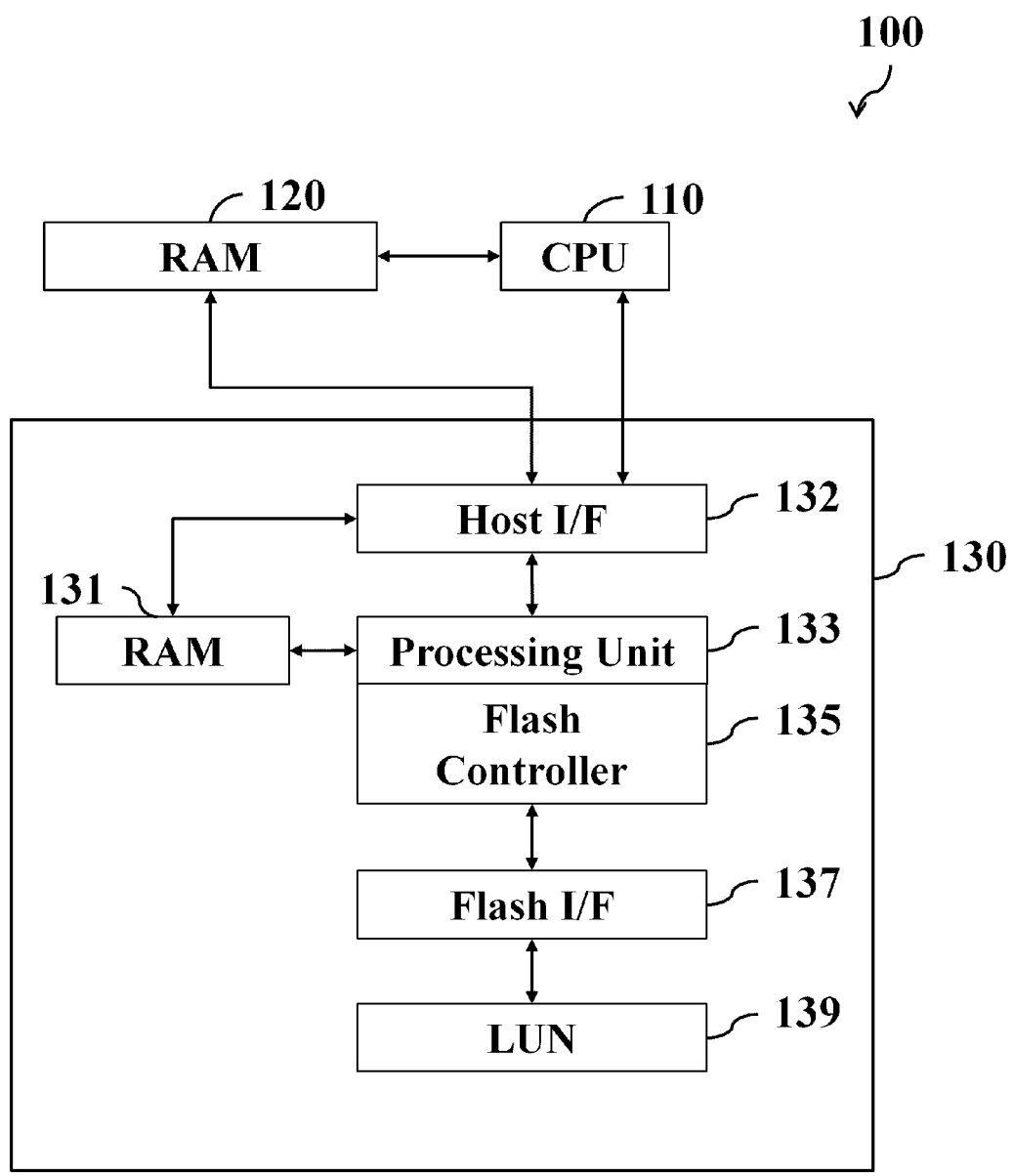
FIG. 1 is the system architecture of a flash memory device according to an embodiment of the invention.

Refer to FIG. 1. The electronic apparatus 100 includes a central processing unit (CPU) 110, a Random Access Memory (RAM) 120 and a storage device 130. The CPU 110 may create queues on demand for its operations. The electronic apparatus may be practiced in a Personal Computer (PC), a laptop PC, a notebook, a mobile phone, a digital camera, a digital recorder, or other consumer electronic products. Specified regions of the RAM 120 may be allocated for data buffers, queues, or others. The storage device 130 may include a processing unit 133 and be optionally equipped with a RAM 131 for improving the performance of the storage device 130. The processing unit 133 may receive commands from the CPU 110 through a host interface (I/F) 132 and instruct a flash controller 135 to perform data reads, data writes, block erases, or others, accordingly. The CPU 110 may communicate with the processing unit 133 by using a communications protocol, such as Universal Flash Storage (UFS), Non-Volatile Memory Express (NVMe), Universal Serial Bus (USB), Advanced Technology Attachment (ATA), Serial Advanced Technology Attachment (SATA), Peripheral Component Interconnect Express (PCI-E), etc., and their extensions. Any of the CPU 110 and the processing unit 133 may be implemented in numerous ways, such as with general-purpose hardware (e.g., a single processor, multiple processors or graphics processing units capable of parallel computations, or others) that is programmed using firmware or software instructions to perform the functions recited herein. The RAM 120 may store necessary data in execution, such as variables, data tables, data abstracts, or others.

A logical Unit Number (LUN) 139 provides huge storage space typically in Gigabytes, or even Terabytes, for storing a wide range of user data, such as high-resolution images, video files, etc. The LUN 139 includes control circuits and a memory array containing memory cells, such as Triple Level Cells (TLCs) or Quad-Level Cells (QLCs). The RAM 131 may be used to buffer user data that is to be programmed into the LUN 139, which is instructed by the CPU 110, and has been read from the LUN 139 but hasn't been clocked out to the CPU 110. The RAM 131 may store a Logical-Physical mapping (L2P) table for fast lookup. The RAM 131 may store necessary data in execution of software and firmware instructions, such as variables, data tables, data abstracts, or others. The RAM 131 may include a Static Random Access Memory (SRAM), a Dynamic Random Access Memory (DRAM), or both.

The storage device 130 further includes a flash controller 135, a flash I/F 137 and the LUN 139 and the flash controller 135 may communicate with the LUN 139 via the flash I/F 137, specifically, using a Double Data Rate (DDR) protocol, such as Open NAND Flash Interface (ONFI), DDR toggle, or others. The flash controller 135 of the storage device 130 writes user data into a designated address (a destination address) of the LUN 139 and reads user data from a designated address (a source address) thereof through the flash I/F 137. The flash I/F 137 may use several electronic signals including a data line, a clock signal line and control signal lines for coordinating command and data transfer between the flash controller 135 and the LUN 139. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc. The processing unit 133 and the flash controller 135 may be implemented in separate chips or integrated with a single chip.

Figure 2:
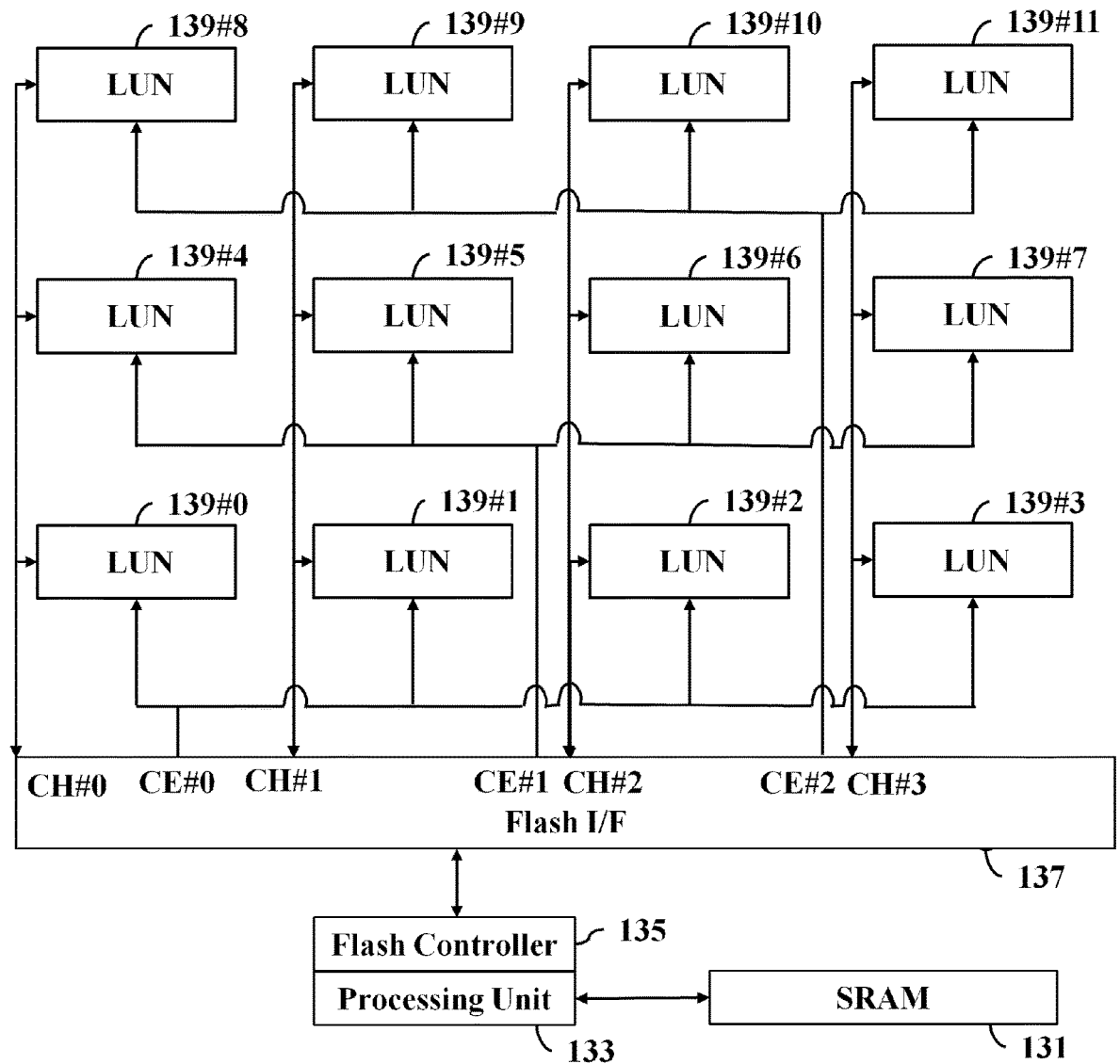
FIG. 2 is a schematic diagram illustrating Logical Unit Numbers (LUNs) connecting to a flash interface.

Refer to FIG. 2. The flash I/F 137 may include four I/O channels (hereinafter referred to as channels) CH #0 to CH #3 each is connected to three LUNs, for example, the channel CH #0 is connected to the LUNs 130 #0, 139 #4 and 139 #8. It is noted that, for satisfying different system requirements, those artisans may dispose more or less channels in the flash I/F 137 each is connected to at least one LUN and the invention should not be limited thereto. The flash controller 135 may drive the flash I/F 17 to issue one of the CE signals CE #0 to CE #2 to enable corresponding ones of LUNs 139 #0 to 139 #3, 139 #4 to 139 #7, or 139 #8 to 139 #11. After that, user data is read from or programmed into the enabled LUNs in parallel.

Figure 3:
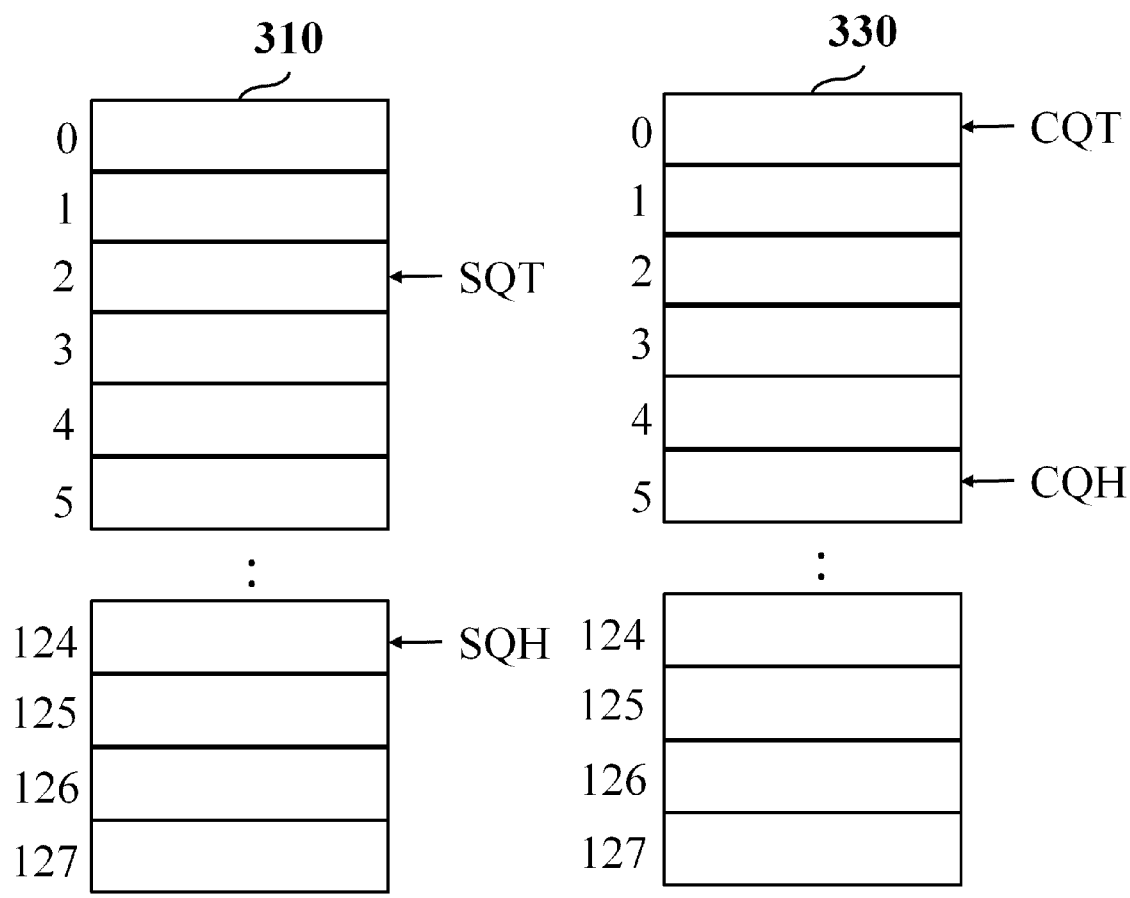
FIG. 3 is a schematic diagram illustrating command queues.

Refer to FIG. 3. Command queues may include a Submission Queue (SQ) 310 and a Completion Queue (CQ) 330 for temporarily storing CPU instructions and Completion Elements (CEs), respectively. The SQ 310 and the CQ 330 are preferably created in a single device, for example, the RAM 120 of a host side in preference, or the RAM 131 of the storage device 130. The SQ 310 and the CQ 350 may be alternatively created in different devices. Each of the SQ 310 and the CQ 330 contains a collection of entries. Each entry of the SQ 310 may store one I/O command, such as an erase, a read or a write command, or others. The entries in the collection are kept in order. The principle operations on the collection are the addition of entities to the rear terminal position (for example, the position pointed by a pointer SQT or CQT), known as enqueue, and removal of entities from the front terminal position (for example, the position pointed by a pointer SQH or CQH), known as dequeue. That is, the first command added to the SQ 510 will be the first one to be removed. The CPU 110 may store data write commands in the SQ 310 and the processing unit 133 may read (or fetch) the earliest arrived data write command from the SQ 310 to execute. After an execution of the data write command completes, the processing unit 133 may store a CE in the CQ 350 and the CPU 110 may read (or fetch) the CE to determine an execution result of the associated data write command.

Figure 4:
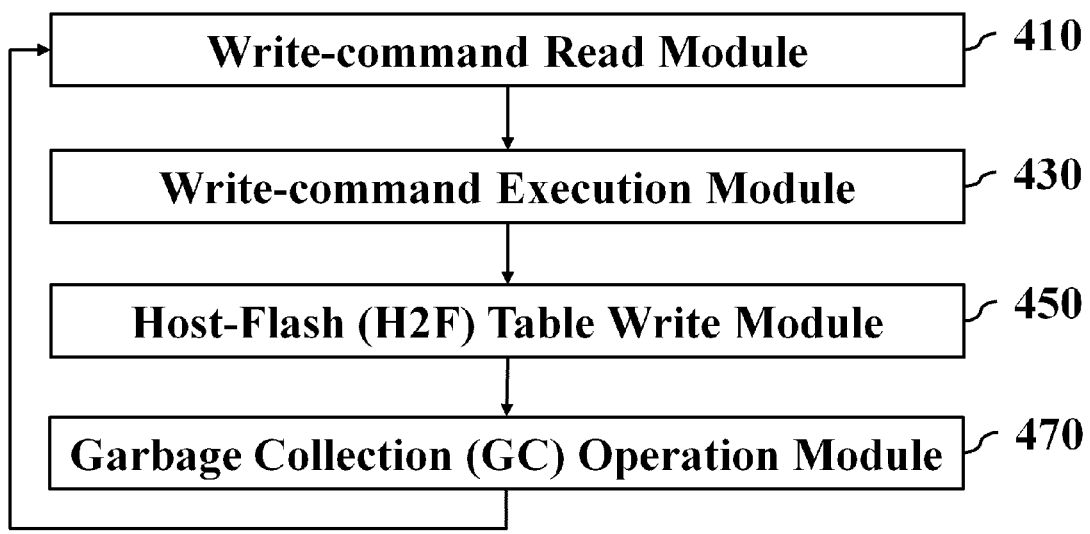
FIG. 4 is a schematic diagram of Flash Translation Layer (FTL) framework.

Refer to FIG. 4. Flash Translation Layer (FTL) framework includes a write-command read module 410, a write-command execution module 430, a Host-Flash mapping (H2F) table write module 450 and a garbage collection (GC) operation module 470. The processing unit 133 when loading and executing a function HW_PushIOCmdInfoPrdInfo( ) composed of program codes of the write-command read module 410 reads a predetermined number of host write commands from a SQ, temporarily stores user data that attempts to be written into designated logical addresses by the host write commands in the RAM 131. The processing unit 133 when loading and executing a function FTL_HandlePrdInfo( ) composed of program codes of the write-command execution module 430 writes the temporarily stored user data of the RAM 131 into the LUN 139 via the flash controller 135 and the flash I/F 137 according to the host write commands, obtains physical address of replied messages from the flash controller 135, and updates proper locations of the H2F table of the RAM 131 with mappings between the logical and physical addresses. The processing unit 133 when loading and executing a function SaveMap( ) composed of program codes of the H2F-table write module 450 writes the updated H2F table into the LUN 139 via the flash controller 135 and the flash I/F 137. The processing unit 133 when loading and executing the GC operation module 470 collects valid user data fragmented across multiple physical pages, and writes the collected user data into active physical pages of the LUN 139 via the flash controller 135 and the flash I/F, so as to reuse the released physical pages after being erased for further user data.

Figure 5:
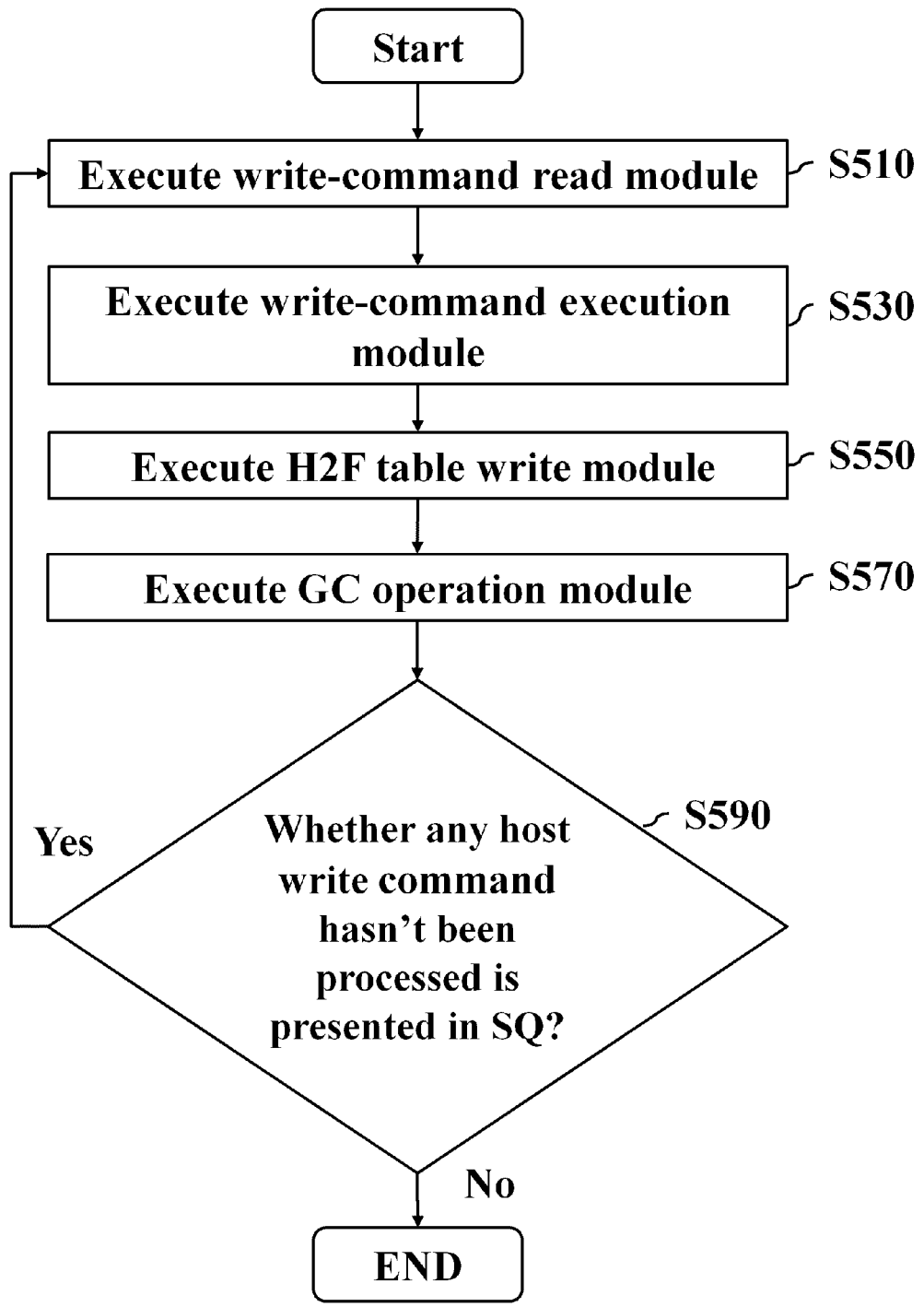
FIG. 5 is a flowchart illustrating a method for performing data writes according to some implementations.

In some implementations, the processing unit 133 when loading and executing programs codes of a control module realizes the method as shown in FIG. 5. When detecting that the CPU 110 starts to store host write commands in the SQ 310, the processing unit 133 may repeatedly execute a loop (steps S510 to S590) until no host write command is presented in the SQ 310 (the "No" path of step S590). In each iteration, the processing unit 133 executes the write-command read module 410, the write-command execution module 430, the H2F table write module 450 and the GC operation module 470 in a row. However, when the time for executing the H2F table write module 450 or the GC operation module 470 takes too long, it may lead to an excessive-long waiting time of the host write commands of the SQ 310 and dissatisfies the requirements of the latency test item for Quality of Service (QoS). Moreover, the CPU 110 may store an arbitrary number of host write commands in the SQ 310 at arbitrary time points while the host I/F 132 (hereinafter may also be referred to as hardware HW) can read at most an upper-bound number of the host write commands. If the CPU 110 issues more host write commands than the upper-bound number at one time, the host I/F 132 can only read and supply the upper-bound number of the host write commands to the write-command read module 410 to process. The remaining host write commands have to wait until the next iteration that the write-command read module 410 starts to process. Due to the lack of time information that each host write command arrives to the SQ 310, the control module (also referred to as firmware FW) cannot know how much delay that has occurred for each host write command obtained from the HW.

Figure 6:
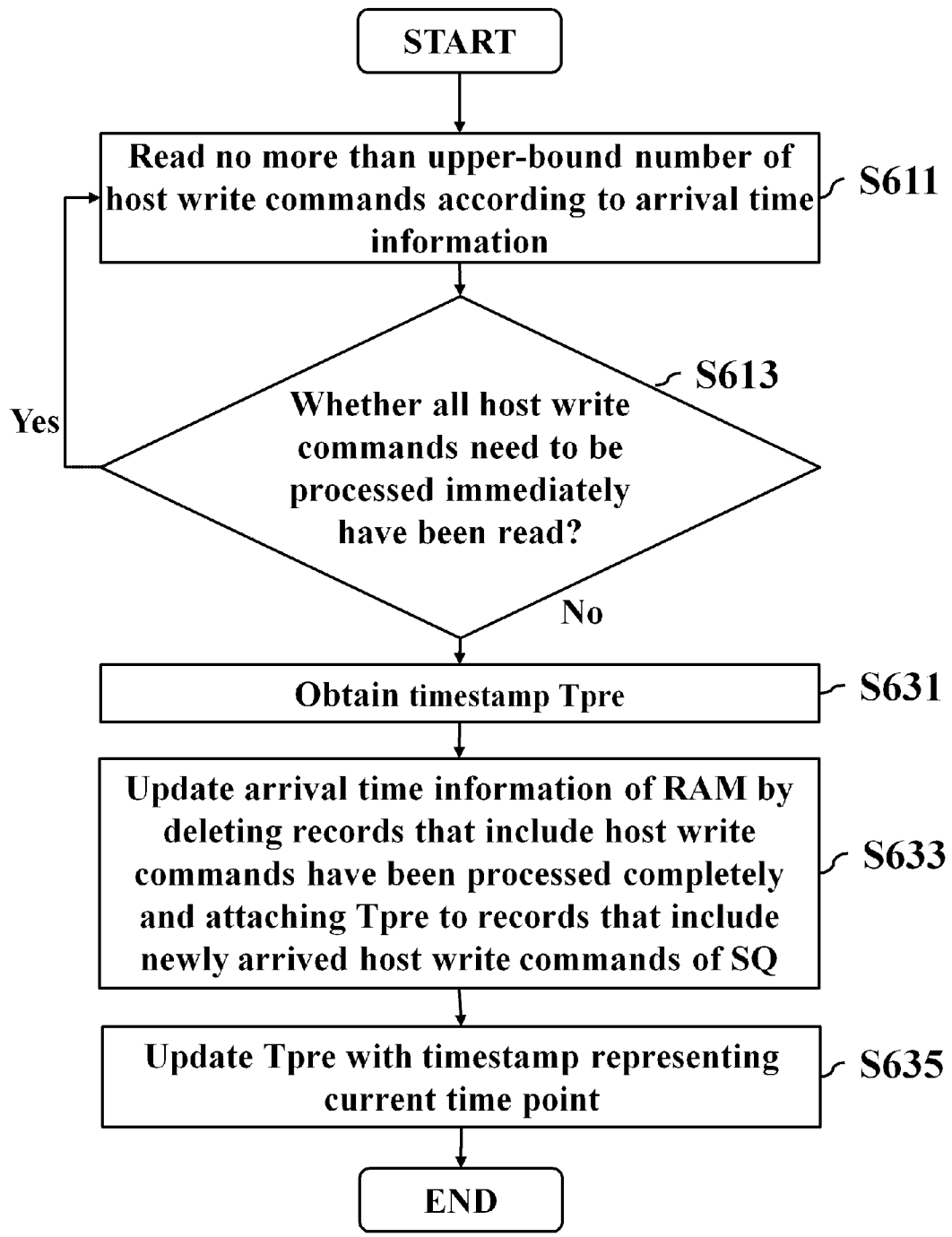
FIG. 6 is a flowchart illustrating a method for processing host write commands according to an embodiment of the invention.

To supplement time information about arrivals of host write commands, in some embodiments, the write-command read module 410 may be devised to further append timestamps to the newly arrival host write commands of the SQ 310 during the process of host write commands. Refer to an embodiment of a method for processing host write commands as shown in FIG. 6. The method is realized by the processing unit 13 when loading and executing the write-command read module 410. First, a loop (steps S611 to S613) is repeatedly executed for reading reads no more than the upper-bound number of the host write commands in a batch. Due to the HW limitation, the processing unit 133 reads no more than the upper-bound number of the host write commands in each iteration. In the first time entering step S611 of the loop, the processing unit 133 may read time information indicating that the host write commands arrived to the SQ 310 from the RAM 131 and determines which host write commands that requires to process immediately according to the arrival time information. The time information about arrivals of the host write commands to the SQ 310 may be practiced by Table 1:

TABLE 1

| Instruction Set Number | Host Write Command Number | Arrival Timestamp |
|---|---|---|
| S0 | W0-W4 | T0 |
| S1 | W5-W9 | T1 |

Each entry of Table 1 may be associated with an instruction set, including an instruction set number, host write command numbers of this instruction set, and an arrival timestamp attached to all host write commands of this instruction set. For example, the instruction set "S0" includes host write commands "W0" to "W4" and their arrival time to the SQ 310 is "T0". "W0" to "W4" may represent host write commands of the $0^{th}$ to $4^{th}$ items of the SQ 310. The processing unit 133 may determine whether the host write commands of one instruction set require to process immediately by Equation (1):

$$Tnow - Ti > Ttr$$

Tnow represents the current time point, i represents a positive integer, Ti represents a time point that the $i^{th}$ host write command arrives to the SQ 310 and Tr represents a threshold. The threshold may be configured with references made to the requirements of the latency test item. For example, if the test item demands that the latency of 99% host write commands should be shorter than 5 ms, then the threshold may be set to a value ranging from 4 to 5 ms. The condition of Equation (1) for the $i^{th}$ host write command has met indicates that the $i^{th}$ host write command of the SQ 310 requires to process immediately.

In the cache mode, the processing unit 133 may obtain each host write command from the SQ 310 through the host I/F 132 and obtain user data to be programmed into the LUN 139 from the RAM 120 through the host I/F 132 according to address information of the host write command and store the user data in the RAM 131. Since a completion of the host write command is considered when the user data has been stored in the RAM 131, the processing unit 133 may store a Completion Element (CE) corresponding to the host write command in the CQ 330 through the host I/F 132. Thereafter, the processing unit 133 may arrange proper time to execute the program codes of the write-command execution module 430 to program the temporarily stored user data of the RAM 131 into the LUN 139 through the flash controller 135 and the flash I/F 137.

In the non-cache mode, or no memory space of the storage device 130 being allocated for temporarily stored user data, the processing unit 133 may directly jump to execute program codes of the write-command execution module 430 for programming the user data into the LUN 139 through the flash controller 135 and the flash I/F 137 after obtaining one or more host write commands and the user data to be written through the host I/F 132. After the user data has been successfully programmed into the LUN 139, the processing unit 133 may return to execute program codes of the write-command execution module 430 for storing CE(s) corresponding to the host write command(s) in the CQ 330. In some embodiments, the write-command read module 410 and the write-command execution module 430 may be integrated into a single module rather than separate modules as shown in the above FTL framework.

After the loop has been executed completely, the processing unit 133 obtains a timestamp Tpre from the RAM 131, representing a time point indicating that the host write commands of the prior batch have been read completely (step S631), updating the arrival time information of the RAM 131 by deleting records that include host write commands have been processed completely and attaching Tpre to records that include newly arrived host write commands of the SQ 310 (step S633), and updating Tpre with the timestamp representing the current time point as a reference for the host write commands of the next batch (step S635).

Figure 7:
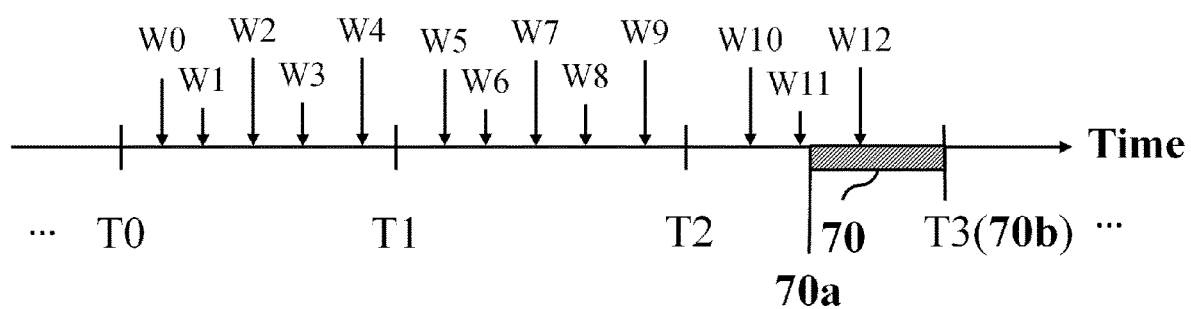
FIG. 7 is a schematic diagram showing time points that host write commands are arrived to a submission queue (SQ) and processed by a processing unit according to an embodiment of the invention.

The following introduces several use cases to illustrate the process flow as shown in FIG. 6. Refer to FIG. 7. The execution of the write-command read module 410 for the prior batch was completed at the time point T2 and the execution 70 of the write-command read module 410 for this batch was started at the time point 70a and completed at the time point T3 (70b). At the time point 70a, the RAM 131 has stored T2 as the timestamp Tpre indicating the end of the execution of the write-command read module 410 for the prior batch, and time information that the host write commands "W0" to "W9" was arrived to the SQ 310, as shown in Table 1. Suppose that the instruction set "S0" (that is, the host write commands "W0" to "W4") satisfying the condition of Equation (1) requires to process immediately. Therefore, the processing unit 133 reads host write commands "W0" to "W4" from the SQ 310 (step S631). When the time approximately reaches to the time point T3, the read operations for the host write commands "W0" to "W4" was completed. After the operations have completed, the processing unit 133 reads the timestamp Tpre (=T2) indicating the end of the execution of the write-command read module 410 for the prior batch (step S633). Suppose that the CPU 110 stored the host write commands "W10" to "W12" in the SQ 310 between time points T2 and T3 and modified the pointer SQT to point to the 13$^{th}$ item of the SQ 310. By comparing the arrival time information of the RAM 131 with the address currently pointed by the pointer SQT, the processing unit 131 knows that the CPU 110 newly stores the host write commands "W10" to "W12" in the SQ 310. Subsequently, the processing unit 131 updates the arrival time information as shown in Table 2 (step S633):

TABLE 2

| Instruction Set Number | Host Write Command Number | Arrival Timestamp |
| --- | --- | --- |
| S1 | W5-W9 | T1 |
| S2 | W10-W12 | T2 |

Although the arrival times of the host write commands "W10" to "W12" are actually later than the time point T2, the earliest possible arrival time point T2 being used as the timestamp Tpre may reduce the possibility that the actual latency of one host write command exceeds the requirement of the test item because the write-command read module 140 does not know the actual arrival time of any host write command.

Although two queues 310 and 330 are shown in FIG. 3, the host side may create more submission sub-queues and completion sub-queues depending on different application requirements. Table 1 may be devised to incorporate with arrival time information of host write commands within different submission sub-queues and the determination may be devised to cover host write commands within all submission sub-queues, thus, the invention should not be limited thereto.

Figure 8:
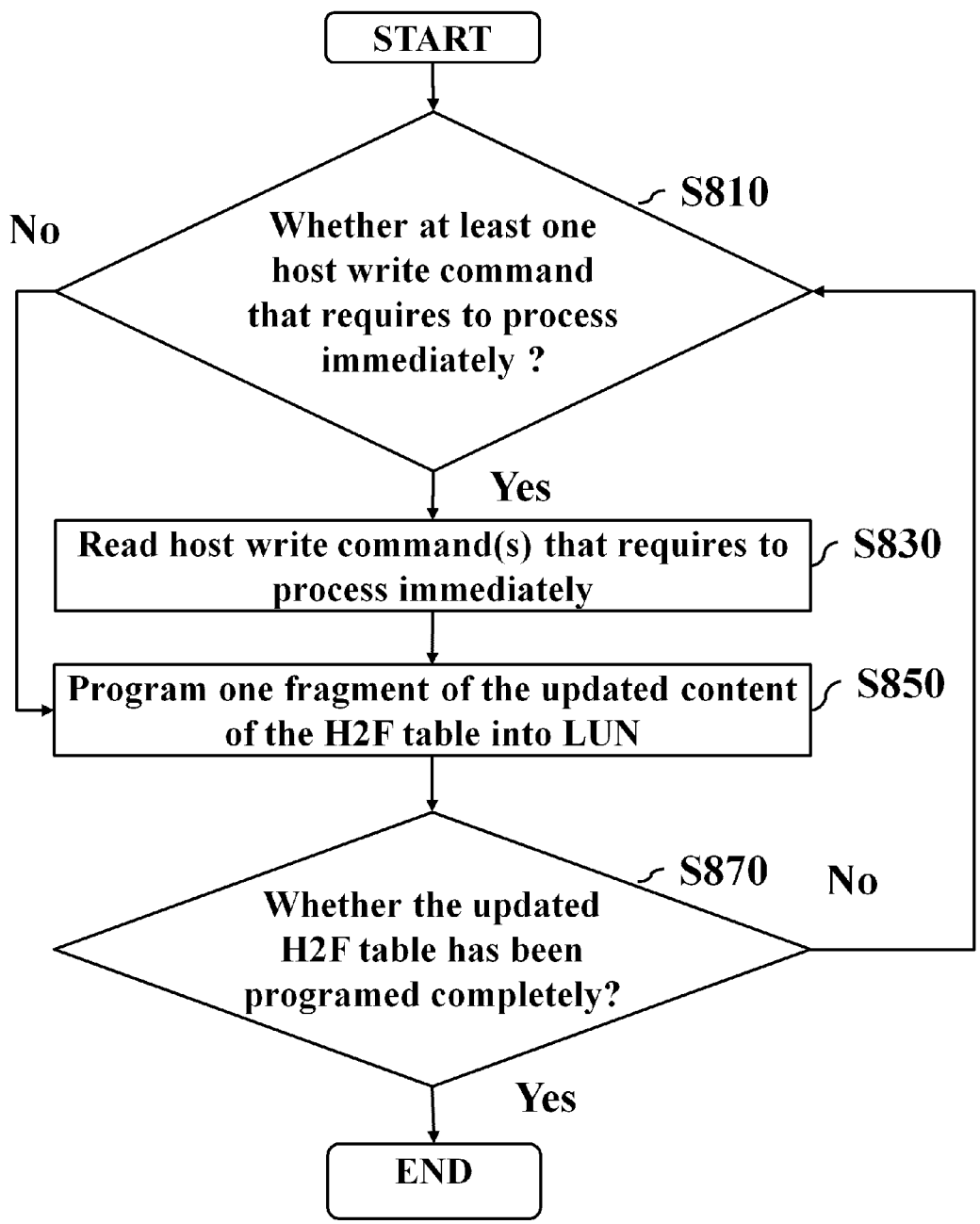
FIG. 8 is a flowchart illustrating a method for updating a Host-Flash mapping (H2F) table according to an embodiment of the invention.
Figure 10:
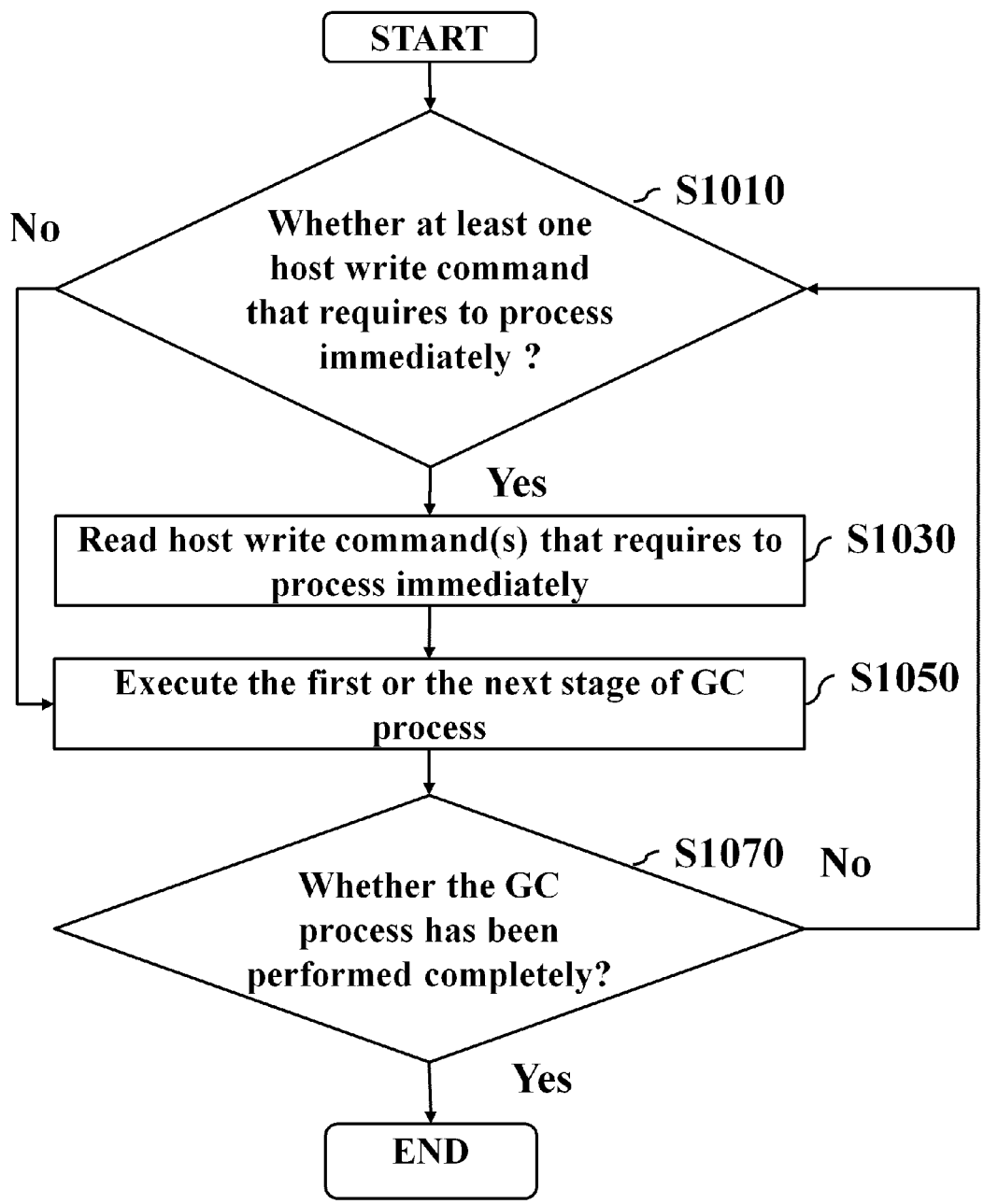
FIG. 10 is a flowchart illustrating a method for performing a Garbage Collection (GC) process according to an embodiment of the invention.

To solve technical problems occurring when the LUN 139 stays in the dirty mode, the flowcharts as shown in FIGS. 8 and 10 illustrate methods for writing data into a flash memory. The methods are realized when the processing unit 133 loads and executes computer codes of relevant software and/or firmware modules to incorporate with steps: determining whether at least one host write command that requires to process immediately is presented in the SQ 310 before performing a portion of a H2F table update or a GC process; executing the host write command(s) that requires to process immediately in a batch and then performing the portion of the H2F table update or the GC process when the determination is positive; and directly performing the portion of the H2F table update or the GC process when the determination is negative. Those artisans know that the H2F table update and the GC process are activated by the storage device 130 per se to optimize the performance of the storage device 130, rather than the host write commands being issued by the CPU 110. Detailed techniques are described as follows:

To avoid frequently updates with the H2F table of the LUN 139, the processing unit 133 may temporarily store a whole or a portion of a H2F table in the RAM 131 (usually a DRAM) and update the content of the temporarily stored H2F table once a write operation completes. To shorten the time of Sudden Power Off Recovery (SPOR) after s Sudden Power Off (SPO) occurs, the processing unit 133 requires to program the updated content of the temporarily stored H2F table into the LUN 139 after a certain number of records thereof have been modified. When the storage device 130 stays in the dirty mode, the above updates for the H2F table may become frequent. However, a time period for completing the programming operations for the whole updated content by the processing unit 133 and the flash I/F 137 may result in longer waiting times of some host write commands of the SQ 310 that dissatisfy the requirements of the QoS latency test item. To avoid the aforementioned problems, in some embodiments, the H2F-table write module 450 may be devised to segment the whole content of the updated H2F table into several fragments and determine whether at least one host write command that requires to process immediately is presented before one fragment of the updated H2F table is programmed. Any host write command that requires to process immediately takes a higher priority over that of the fragmented H2F-table update.

Figure 9:
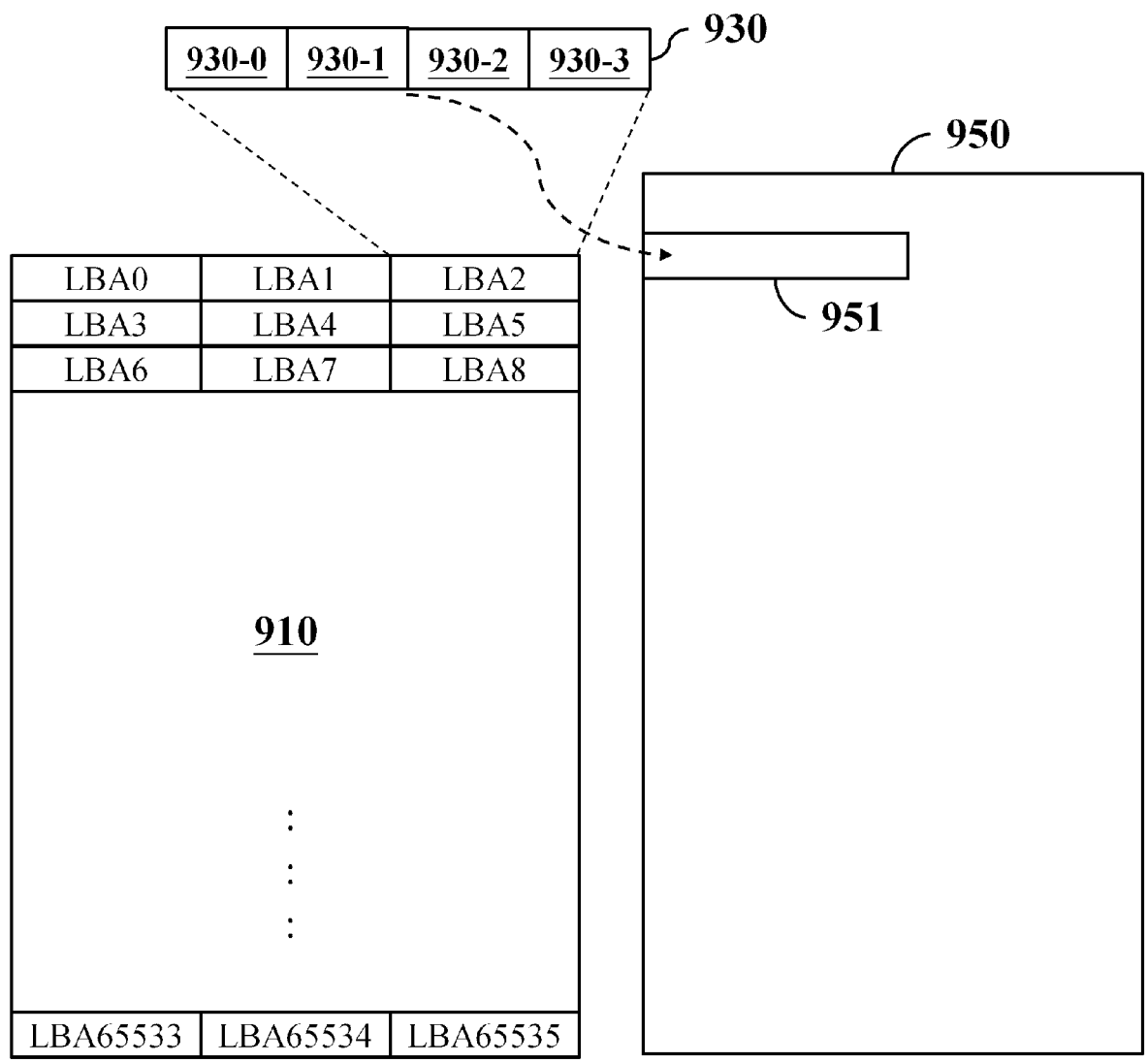
FIG. 9 is a schematic diagram showing physical storage mappings according to an embodiment of the invention.

Refer to FIG. 9. The H2F table 910 may store physical address information corresponding to each logical address (or Logical Block Address LBA) preferable in sequence. The occupied space of the H2F table 910 is directly proportional to a total number of logical addresses preferably. Each logical address may be represented by an LBA and each LBA maps to a fixed length of a logical block, such as 512 bytes, with which the corresponding data is stored in a physical address. For example, the H2F table 910 sequentially stores physical address information from LBA #0 to LBA #65535. Data of several continuous logical addresses (such as LBA #0 to LBA #7) may form a host page. The physical address information 930 may be represented by four bytes: the first byte 930-0 records a (physical) block number, the second byte 930-1 records (physical) page number (and offset), the third byte 930-2 records a (physical) plane number and the last byte 930-3 records a LUN number, a I/O channel number, or others. For example, the physical address information 930 corresponding to LBA #2 points to a region 951 of a block 950.

Refer to an embodiment of a method for updating the H2F table, performed by the processing unit 133 when loading and executing program codes of the H2F-table write module 450, as shown in FIG. 8. The processing unit 133 may repeatedly execute a loop (steps S810 to S870) for programming the whole updated content of the H2F table into the LUN 139 fragment by fragment. For example, in response to physical address information corresponding to LBA #0 to LBA #2047 of the temporarily stored H2F table that has been updated, the processing unit 133 may program physical information corresponding to LBA #0 to LBA #1023 thereof (i.e. the first fragment) in one batch, and then, physical information corresponding to LBA #1024 to LBA #2047 thereof (i.e. the second fragment) in the next batch. In each iteration, the processing unit 133 determines whether at least one host write command that requires to process immediately (step S810). Determination details for the host write command may refer to the above descriptions of Table 1, step S613 and Equation (1), and are omitted hereinafter for brevity. When any host write command that requires to process immediately (the "Yes" path of step S810), the processing unit 133 reads the host write command(s) that requires to process immediately first (step S830), and then, programs (or stores) one fragment of the updated content of the H2F table into the LUN 139 (step S850). When no host write command that requires to process immediately (the "No" path of step S810), the processing unit 133 directly programs one fragment of the updated content of the H2F table into the LUN 139 (step S850).

When the storage device 130 is in the dirty mode, many physical pages of the LUN 139 each may include valid and invalid sectors (also referred to as stale sectors), in which the valid sectors store valid user data while the invalid sectors store invalid (expired) user data. When detecting that available space of the LUN 139 is insufficient, the processing unit 133 may direct the flash controller 135 to read and collect user data of the valid sectors, and then, direct the flash controller 135 to program the collected user data into empty physical pages of an active block (so-called a destination block), thereby making the data block (so-called the source block) storing invalid user data to become a spare block. The spare block after being erased may provide space as an active block for storing more data. The above steps are referred to as a Garbage Collection (GC) process.

However, a time period for completing the whole GC process by the processing unit 133 and the flash I/F 137 may result in longer waiting times of some host write commands of the SQ 310 that dissatisfy the requirements of the QoS latency test item. To avoid the aforementioned problems, in some embodiments, the GC operation module 470 may be devised to divide the whole process into several stages and determine whether at least one host write command that requires to process immediately is presented before one stage of the GC process is performed. Any host write command that requires to process immediately takes a higher priority over that of the stage of GC process.

In some embodiments, the whole GC process may be divided into five stages: The processing unit 133 in the first stage may determine source addresses of source blocks that store valid user data, and destination addresses of destination blocks. In the second stage, the processing unit 133 may instruct the flash controller 135 to read user data from the source addresses of the LUN 139 and instruct the flash controller 135 to program the read user data into the destination addresses of the LUN 139. The processing unit 133 may update the H2F table and the Physical-Logical mapping (P2L) table in the third and fourth stages, respectively. The processing unit 133 may modify the source blocks with spare blocks. The aforementioned stage specifications are described as examples, those artisans may combine two or more stages of the GC operation module 470 in a single one or divide one single stage of the GC operation module 470 into two or more stages depending on operation speeds of the processing unit 133, the flash controller 135 and the flash I/F 137. In addition, the GC operation module 470 may be devised to optimize the execution sequence of these five stages according to processing statuses, for example, arranging the first and second stages into a loop until the desired destination blocks have no space to program user data come from the source blocks. Then, the third to fifth stages are executed after the loop is jumped out.

Refer to an embodiment of a method for performing a GC process as shown in FIG. 10. The method is performed by the processing unit 133 when loading and executing program codes of the GC operation module 470. The processing unit 133 may repeatedly execute a loop (steps S1010 to S1070) for performing the GC process stage by stage. In each iteration, the processing unit 133 determines whether at least one host write command that requires to process immediately (step S1010). Determination details for the host write command may refer to the above descriptions of Table 1, step S613 and Equation (1), and are omitted hereinafter for brevity. When any host write command that requires to process immediately (the "Yes" path of step S1010), the processing unit 133 reads the host write command(s) that requires to process immediately first (step S1030), and then, executes the first or the next stage of the GC process (step S1050). When no host write command that requires to process immediately (the "No" path of step S1010), the processing unit 133 directly executes the first or the next stage of the GC process (step S1050).

In some embodiments of steps S830 or S1030, the processing unit 133 may call and execute the function HW_PushIOCmdInfoPrdInfo( ) for performing the process steps as shown in FIG. 6. In alternative embodiments of steps S830 or S1030, program codes of process steps as shown in FIG. 6 may be embedded in the H2F-table write module 450 or the GC operation module 470 for executions by the processing unit 133.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computerreadable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIG. 1, it should be noted that additional elements may be included to achieve better performance without departing from the spirit of the invention. Each element of FIG. 1 is composed of various circuits and arranged to operably perform the aforementioned operations. While the process flows described in FIGS. 6, 8 and 10 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing data writes into a flash memory, performed by a processing unit in response to loading and executing program codes of a software or firmware module, comprising:
   dividing a Host-Flash mapping (H2F) table update into a plurality of portions, wherein the H2F table update comprises programming physical address information associated with a successive range of logical addresses into a logical unit number (LUN) through a flash interface;
   in response to detecting a number of host write commands less than or equal to a threshold, determining whether at least one host write command that requires to process immediately is presented in a submission queue (SQ) by an equation: Tnow−Ti>Ttr before performing any portion of the H2F table update, wherein Tnow represents a current time point, i represents a positive integer, Ti represents a time point indicating that host write commands of a batch before an $i^{th}$ host write command have been executed completely, Tr represents a threshold, and the equation for the $i^{th}$ host write command has met indicates that the $i^{th}$ host write command of the SQ requires to process immediately; and
   executing the host write command that requires to process immediately in a batch and then performing a corresponding portion of the H2F table update in response to at least one host write command that requires to process immediately is presented in the SQ.

2. The method of claim 1, wherein Ti is a timestamp, which is attached to the $i^{th}$ host write command.

3. The method of claim 1, comprising:
   performing the portion of the H2F table update in response to no host write command in the SQ requires to process immediately.

4. The method of claim 1, wherein executing each host write command comprises: obtaining the host write command from the SQ through a host interface; obtaining user data to be programmed into a LUN from a first random access memory (RAM) through the host interface according to address information of the host write command; storing the user data in a second RAM; and storing a completion element (CE) corresponding to the host write command in a completion queue (CQ) through the host interface.

5. The method of claim 4, wherein the processing unit and the second RAM are located within a storage device, and the first RAM is located outside of the storage device.

6. The method of claim 1, wherein executing each host write command comprises: obtaining the host write command from the SQ through a host interface; obtaining user data to be programmed into a LUN from a random access memory (RAM) through the host interface according to address information of the host write command; programming the user data into the LUN through a flash interface; and storing a Completion Element (CE) corresponding to the host write command in a completion queue (CQ) through the host interface.

7. The method of claim 6, wherein the processing unit is located within a storage device, and the RAM is located outside of the storage device.

8. A non-transitory computer program product for performing data writes into a flash memory when executed by a processing unit, the non-transitory computer program product comprising program code to:
   divide a Host-Flash mapping (H2F) table update into a plurality of portions, wherein the H2F table update comprises programming physical address information associated with a successive range of logical addresses into a logical unit number (LUN) through a flash interface;
   in response to detecting a number of host write commands less than or equal to a threshold, determine whether at least one host write command that requires to process immediately is presented in a submission queue (SQ) by an equation: Tnow−Ti>Ttr before performing any portion of the H2F table update, wherein Tnow represents a current time point, i represents a positive integer, Ti represents a time point indicating that host write commands of a batch before an $i^{th}$ host write command have been executed completely, Tr represents a threshold, and the equation for the $i^{th}$ host write command has met indicates that the $i^{th}$ host write command of the SQ requires to process immediately; and
   execute the host write command that requires to process immediately in a batch and then performing a corresponding portion of the H2F table update in response to at least one host write command that requires to process immediately is presented in the SQ.

9. The non-transitory computer program product of claim 8, wherein Ti is a timestamp, which is attached to the $i^{th}$ host write command.

10. The non-transitory computer program product of claim 8, comprising program code to:

perform the portion of the H2F table update in response to no host write command in the SQ requires to process immediately.

11. The non-transitory computer program product of claim 8, comprising program code to: for executing each host write command, obtain the host write command from the SQ through a host interface; obtain user data to be programmed into a LUN from a first random access memory (RAM) through the host interface according to address information of the host write command; storing the user data in a second RAM; and store a completion element (CE) corresponding to the host write command in a completion queue (CQ) through the host interface.

12. The non-transitory computer program product of claim 11, wherein the processing unit and the second RAM are located within a storage device, and the first RAM is located outside of the storage device.

13. The non-transitory computer program product of claim 8, comprising program code to: for executing each host write command, obtain the host write command from the SQ through a host interface; obtain user data to be programmed into a LUN from a random access memory (RAM) through the host interface according to address information of the host write command; program the user data into the LUN through a flash interface; and store a Completion Element (CE) corresponding to the host write command in a completion queue (CQ) through the host interface.

14. The non-transitory computer program product of claim 13, wherein the processing unit is located within a storage device, and the RAM is located outside of the storage device.

15. An apparatus for performing data writes into a flash memory, comprising:
a flash interface; and
a processing unit, coupled to the flash interface, arranged to operably divide a Host-Flash mapping (H2F) table update into a plurality of portions, wherein the H2F table update comprises programming physical address information associated with a successive range of logical addresses into a logical unit number (LUN) through a flash interface; in response to detecting a number of host write commands less than or equal to a threshold, determine whether at least one host write command that requires to process immediately is presented in a submission queue (SQ) by an equation: Tnow−Ti>Ttr before performing any portion of the H2F table update, wherein Tnow represents a current time point, i represents a positive integer, Ti represents a time point indicating that host write commands of a batch before an $i^{th}$ host write command have been executed completely, Tr represents a threshold, and the equation for the $i^{th}$ host write command has met indicates that the $i^{th}$ host write command of the SQ requires to process immediately; and execute the host write command that requires to process immediately in a batch and then performing a corresponding portion of the H2F table update through the flash interface in response to at least one host write command that requires to process immediately is presented in the SQ.

16. The apparatus of claim 15, wherein Ti is a timestamp, which is attached to the $i^{th}$ host write command.

17. The apparatus of claim 15, wherein the processing unit is arranged to operably perform the portion of the H2F table update through the flash interface in response to no host write command in the SQ requires to process immediately.

18. The apparatus of claim 15, comprising: a second random access memory (RAM), wherein the processing unit is arranged operably to, for executing each host write command in a cache mode, obtain the host write command from the SQ through a host interface; obtain user data to be programmed into a LUN from a first RAM through the host interface according to address information of the host write command; store the user data in the second RAM; and store a completion element (CE) corresponding to the host write command in a completion queue (CQ) through the host interface.

19. The apparatus of claim 15, wherein the processing unit is arranged operably to, for executing each host write command in a non-cache mode, obtain a host write command from the SQ through a host interface; obtain user data to be programmed into a logical unit number (LUN) from a random access memory (RAM) through the host interface according to address information of the host write command; program the user data into the LUN through the flash interface; and store a completion element (CE) corresponding to the host write command in a completion queue (CQ) through the host interface.

20. The apparatus of claim 15, wherein the SQ is created in a host side.

* * * * *